Oct. 27, 1925.
E. T. BENNINGTON
TRAMRAIL CARRIER
Filed Sept. 25, 1924
1,558,779
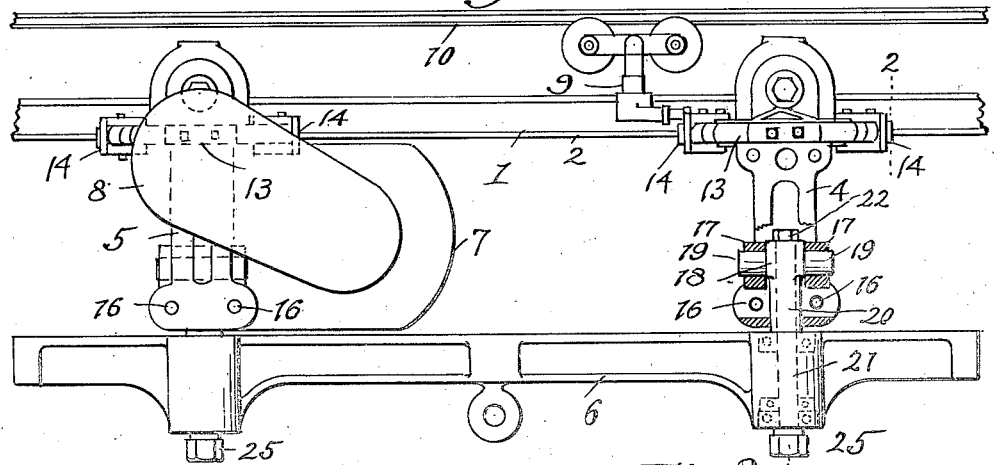
Fig. 1.
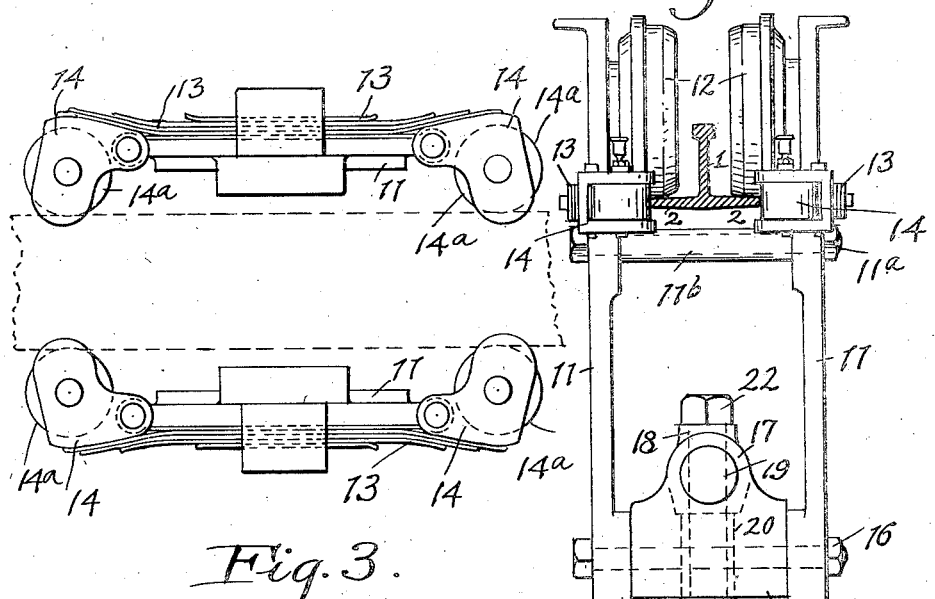
Fig. 2.
Fig. 3.

Patented Oct. 27, 1925.

1,558,779

UNITED STATES PATENT OFFICE.

EARL T. BENNINGTON, OF CLEVELAND HEIGHTS, OHIO, ASSIGNOR TO THE CLEVELAND CRANE & ENGINEERING COMPANY, OF WICKLIFFE, OHIO, A CORPORATION OF OHIO.

TRAMRAIL CARRIER.

Application filed September 25, 1924. Serial No. 739,793.

*To all whom it may concern:*

Be it known that I, EARL T. BENNINGTON, a citizen of the United States, residing at Cleveland Heights, in the county of Cuyahoga and State of Ohio, have invented a certain new and useful Improvement in Tramrail Carriers, of which the following is a full, clear, and exact description.

This invention relates to a tramrail carrier of the type in which the rigid load bar of the carrier is suspended from front and rear wheels adapted to travel along an overhead track.

The present invention has for its object to provide a carrier so constructed that all of the supporting wheels are maintained always in firm contact with the supporting rail upon which they travel and in which the supporting wheels are held in engagement with the track in passing around curves or over poorly aligned rails.

In carriers of the type to which the present invention relates accidents have frequently been caused by the breaking of the king bolts which support the load bar.

It is one of the objects of the present invention to provide a flexible suspension for the load bar which insures an even pressure upon the supporting wheels in passing around curves and over irregularities in the track and which prevents binding of the king bolts upon which the load bar is suspended thereby relieving said bolts of the twisting strains to which said bolts have been subjected in carriers heretofore constructed.

In addition to the flexible suspension of the load bar, yieldable guiding means is provided on the carrier which engages with the supporting track and resists lateral movement of the wheel carrying heads which would tend to lift the supporting wheels at one side of the heads out of contact with the track.

A further object is to provide a carrier in which the load bar is suspended from a single pair of wheels at each end, the wheel carrying heads being so constructed and arranged that chattering of the wheels on the rails is prevented.

With the above and other objects in view, the invention may be said to comprise a device as shown in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which Fig. 1 is a side elevation of a carrier embodying the invention; Fig. 2 is a vertical section taken on line 2—2 of Fig. 1; Fig. 3 is a top plan view of the carrier with supporting wheels omitted to show the mounting of the guide rollers.

Referring to the accompanying drawings the invention is shown applied to a monorail carrier which is adapted to travel upon an overhead track rail 1 which has laterally projecting flanges 2 upon which the supporting wheels of the carrier travel. The carrier is provided at the front and rear ends thereof with vertically disposed supporting heads 4 and 5 from which the rigid load bar 6 is suspended. The two heads 4 and 5 are of the same construction, the rear head 5 having associated therewith a motor 7 which has driving connections within the gear casing 8 to the supporting wheels at the upper end of the head 5. The front supporting head 4 may be provided with a current collector 9 in the form of a trolley engaging with a conductor rail 10, suitable connections being provided from the collector 9 to the motor for operating the motor to propel the carrier.

Each of the supporting heads consists of a pair of vertically disposed side bars 11 which are positioned upon opposite sides of the rail 1 and carry at their upper ends flanged supporting wheels 12 which travel upon the flanges 2 of the supporting rail. A horizontally disposed leaf spring 13 is attached at its center to each of the side bars 11, the ends of the spring 13 projecting beyond the side edges of the bars 11 and bearing against pivoted yokes 14 which carry vertically disposed rollers 14ª which bear against the edges of the flanges 2. The rollers 14ª are yieldingly held in contact with the flanges 2 by the springs 13 and yieldably resist lateral movements of the heads 4 and 5 with respect to the supporting rail so that the two supporting wheels 12 of each head are prevented from being lifted out of contact with the rail. The yielding guide rollers engaging with the supporting rail upon both sides of each of the heads serve to maintain the supporting wheels at all times in firm engagement with the rail and prevent chattering, the yielding guide rollers enabling the carrier to be supported by a single pair of wheels upon each of the heads.

Immediately beneath the rail 1 the side bars 11 are rigidly connected by bolts 11$^a$ and are rigidly held in the proper spaced relation by sleeves 11$^b$ upon the bolts 11$^a$ between the bars. The lower ends of the bars 11 have secured between them spacing block 15 to which the bars 11 are secured by spaced bolts 16 which extend through the spacing block 15 and side bars 11. The spacing block 15 has a pair of aligned bearing portions 17 projecting upwardly therefrom, the axis of the bearing portions 17 extending longitudinally of the carrier. The spacing block 15 has a vertical opening at the center thereof and in this opening there is mounted a casting 18 which has trunnions 19 engaging in the bearing portions 17. The casting 18 has a vertical tubular portion 20 below its pivot which is adapted to swing within the opening of the block 15 and a king bolt 21 is suspended from the casting 18, the king bolt 21 passing through the casting from the top thereof and through the depending tubular portion 20 thereof. The king bolt 20 has a head 22 engaging the upper end of the casting 18 and projects below the lower end thereof, the load bar 6 being swiveled to the projecting lower end of the king bolt by upper and lower thrust bearings 23 and 24. The load bar 6 is supported on the king bolts by means of nuts 25 upon the lower ends of the bolts, washers 26 being interposed between the nuts 25 and bearings 24 and lock nuts 27 being provided upon the outer sides of the nuts 25.

The king bolts 21 being free to swing laterally about the axis of the trunnions 19, permit the load bar 6 to assume a position with respect to the supporting heads in which the king bolts 21 are in vertical position so that when the carrier is passing over portions of the track 1 in which the track is tilted laterally as on curves, the load does not tend to tilt the head in such manner that the wheels on one side are lifted off the track. Furthermore, the king bolts are relieved of bending and twisting strains such as occur in carriers in which the king bolt is rigidly supported from the head. The swivel bearings by which the load bar 6 is supported upon the king bolts permits relative movement between the load bar and the supporting heads about the axes of the king bolts so that the carrier may pass freely around curves in the track. The flexible support for the load bar, together with the yielding guide rollers engaging the track enables the carrier to travel around curves and over irregular sections of track with a minimum of chattering of the supporting wheels and with a minimum strain upon parts of the carrier.

Having described my invention, I claim—

1. A carrier comprising supporting wheels, heads suspended from said wheels, king bolts flexibly suspended from said heads, and a load bar swiveled to said bolts.

2. A carrier comprising spaced supporting heads having supporting wheels adapted to run on a track, a load bar, and means connecting each of said heads to the load bar, said connecting means permitting relative pivotal movement about a plurality of axes between the load bar and each of said heads.

3. A carrier comprising spaced supporting heads having supporting wheels adapted to run on a track, a load bar, and king bolts for suspending said load bar from the heads, the load bar being connected to each king bolt for pivotal movement about the longitudinal axis of the bolt, and each king bolt being pivotally connected to its head for lateral swinging movement.

4. A carrier comprising a pair of spaced supporting heads, each having a single pair of oppositely disposed supporting wheels, a king bolt suspended from each of said heads, said king bolts being pivoted to the heads to swing transversely with respect thereto, and a rigid load bar swiveled to said depending king bolts.

5. A carrier having a head provided with a single pair of coaxial wheels adapted to travel on opposite flanges of a monorail track and yieldably mounted guide rollers carried by said head and adapted to engage opposite sides of the track to the front and to the rear of said wheels.

6. In a carrier of the character described, a head having side bars adapted to be positioned on opposite sides of a track rail, wheels carried by said side bars and adapted to travel on the opposite flanges of the rail, and spring pressed rollers carried by said side bars and adapted to engage opposite sides of the rail.

7. In a carrier of the character described a head, wheels carried by the head and adapted to travel upon opposite sides of a track, leaf springs attached intermediate their ends to opposite sides of the head, and rollers carried by the free ends of the springs and adapted to engage opposite sides of a track.

8. In a carrier of the character described a head having side bars adapted to be positioned upon opposite sides of a flanged track rail, a wheel carried by each side bar and adapted to run on the adjacent flange of the track, a leaf spring attached intermediate its ends to each of the side bars and projecting to opposite sides thereof, and rollers mounted at the free ends of the springs in position to engage with the edges of the track rail flanges.

9. A carrier comprising heads having supporting wheels adapted to engage the track, a load bar flexibly suspended from the heads, and means for yieldably resisting lateral movements of the heads with respect to the supporting rails.

10. A carrier comprising supporting wheels adapted to travel on a track, heads suspended from said wheels, a load bar flexibly suspended from said heads, and spring pressed rollers carried by the heads and adapted to engage opposite sides of the track.

In testimony whereof, I hereunto affix my signature.

EARL T. BENNINGTON.